(12) United States Patent
Van Nieuwstadt et al.

(10) Patent No.: US 8,459,243 B2
(45) Date of Patent: Jun. 11, 2013

(54) METHOD, SYSTEMS AND SENSOR FOR DETECTING HUMIDITY

(75) Inventors: Michiel J. Van Nieuwstadt, Ann Arbor, MI (US); Dave Charles Weber, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 894 days.

(21) Appl. No.: 12/610,029

(22) Filed: Oct. 30, 2009

(65) Prior Publication Data

US 2011/0023855 A1    Feb. 3, 2011

Related U.S. Application Data

(60) Provisional application No. 61/230,518, filed on Jul. 31, 2009.

(51) Int. Cl.
| | | |
|---|---|---|
| *F01N 31/00* | (2006.01) |
| *F01N 3/10* | (2006.01) |
| *F02M 25/06* | (2006.01) |
| *F02D 41/00* | (2006.01) |
| *G01N 7/00* | (2006.01) |
| *G01N 15/00* | (2006.01) |

(52) U.S. Cl.
USPC ............ 123/677; 123/703; 701/102; 60/276; 60/279; 60/301; 60/285; 60/295; 73/23.31; 73/23.32; 73/114.71; 73/114.69; 73/114.72

(58) Field of Classification Search
CPC ............ F02D 41/1441; F02D 2200/703; F02D 2200/704; F02D 41/1456; F02D 41/0275; F02D 41/029; F02D 41/005; F02D 41/18; F02D 2041/001; F02D 41/0002; F02D 2200/0406; F02D 41/1454; F02D 41/1494; F02D 41/1495; F02M 25/0718; F01N 3/0842; F01N 13/02; F01N 3/0814; F01N 13/008; F01N 2560/05; F01N 11/00; B60W 10/06; G01N 27/407; G01N 24/4077; G01N 27/4065; G01M 15/102; F01M 15/104
USPC ................. 123/703, 677, 568.22; 701/102, 701/103, 109; 73/23.31, 23.32, 114.71, 114.72, 73/114.69; 60/285, 295, 276, 279, 301
See application file for complete search history.

(56) References Cited

U.S. PATENT DOCUMENTS

| | | | |
|---|---|---|---|
| 6,575,148 B1 * | 6/2003 | Bhargava et al. | 123/564 |
| 6,681,171 B2 | 1/2004 | Rimnac et al. | |
| 6,886,336 B2 | 5/2005 | Super et al. | |

(Continued)

FOREIGN PATENT DOCUMENTS

| | | | |
|---|---|---|---|
| JP | 203222605 | * | 8/2003 |
| JP | 2012008008 | * | 1/2012 |

*Primary Examiner* — Stephen K Cronin
*Assistant Examiner* — Raza Najmuddin
(74) *Attorney, Agent, or Firm* — Julia Voutyras; Alleman Hall McCoy Russell & Tuttle LLP

(57) ABSTRACT

Methods systems and device for detecting humidity in air through use of an ammonia sensor included in the exhaust of an engine, such as a diesel engine are provided. In one example, a method for an engine having an exhaust with an ammonia sensor includes adjusting an operating parameter in response to ambient humidity, the ambient humidity based on a first ammonia sensor reading at a first exhaust air-fuel-ratio and a second ammonia sensor reading at a second exhaust air-fuel-ratio.

16 Claims, 5 Drawing Sheets

U.S. PATENT DOCUMENTS

| | | |
|---|---|---|
| 7,292,929 B2 | 11/2007 | Durand |
| 7,294,252 B2* | 11/2007 | Wang et al. .................. 205/781 |
| 7,673,444 B2* | 3/2010 | Yano et al. ...................... 60/277 |
| 8,359,841 B2* | 1/2013 | Goya et al. ...................... 60/295 |
| 2007/0079597 A1* | 4/2007 | Wang et al. .................... 60/277 |
| 2009/0139210 A1* | 6/2009 | Sanchez ........................ 60/276 |
| 2009/0266142 A1* | 10/2009 | Wang et al. .................. 73/23.32 |
| 2011/0041480 A1* | 2/2011 | Yasui et al. .................... 60/286 |
| 2011/0259290 A1* | 10/2011 | Michikawauchi et al. ... 123/1 A |
| 2012/0055139 A1* | 3/2012 | Aichhorn ....................... 60/286 |

* cited by examiner

METHOD, SYSTEMS AND SENSOR FOR DETECTING HUMIDITY

CROSS-REFERENCE TO RELATED APPLICATIONS

This application claims priority from U.S. Provisional Patent Application No. 61/230,518, entitled "Method, Systems and Sensor for Detecting Humidity," filed Jul. 31, 2009, the disclosure of which is hereby incorporated by reference in its entirety and for all purposes.

TECHNICAL FIELD

The present application relates to adjusting various operating parameters in response to ambient air humidity, the humidity identified based on an ammonia sensor included in the exhaust of an engine, such as a diesel engine.

BACKGROUND AND SUMMARY

Ammonia sensors may be used in exhaust emission control to maintain accurate control of injected reductant, such as injected urea. However, the inventors herein have recognized that depending on the ambient humidity, the ammonia reading from the sensor may be erroneous.

However, the inventors herein have also recognized that the errors due to ambient humidity manifest themselves in a predictable way across different air-fuel ratios. Further, the inventor have developed various approaches that correlate the sensor readings under selected conditions to ambient humidity. As such, the sensitivity to ambient humidity may be used to advantage, rather than viewed as purely a detrimental effect.

In one example, a method for an engine having an exhaust with an ammonia sensor includes adjusting an operating parameter in response to ambient humidity, the ambient humidity based on a first reading of the ammonia sensor at a first exhaust air-fuel-ratio and a second reading of the ammonia sensor at a second exhaust air-fuel-ratio.

In another example, a method using an ammonia sensor in an engine exhaust SCR system, includes in a first mode, identifying ambient humidity by measuring an ammonia concentration via the ammonia sensor during two different air-fuel-ratios, the measuring in response to an indication of a potential humidity change and may further include in a second mode, controlling an ammonia or urea injection dosage via feedback from the ammonia sensor, where during the first mode, ammonia or urea injection dosage is independent of current ammonia sensor feedback and based on previous ammonia sensor feedback. In still another example, a method for an engine having an ammonia sensor in an exhaust downstream of an SCR catalyst, includes during a first mode, adjusting ammonia injection in response to the sensor, and during a second mode, adjusting ammonia injection independent of the sensor while indicating ambient humidity based on the sensor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
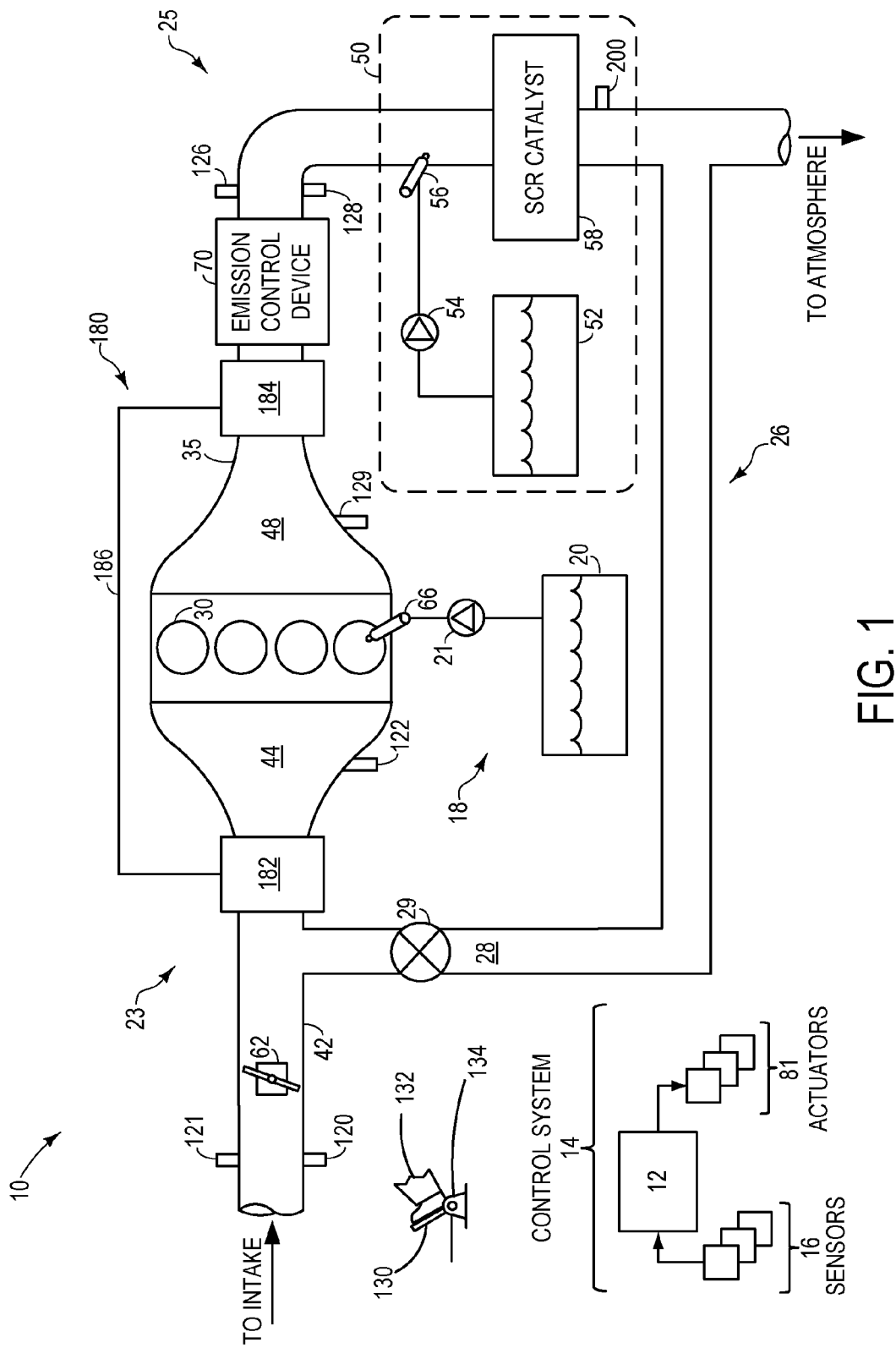
FIG. 1 shows an example diesel engine including a selective catalytic reduction system with an ammonia sensor.

FIG. 1 shows an example diesel engine 10 including a selective catalytic reduction (SCR) system 50 with an ammonia sensor 200. Though the example presented is a diesel engine, reducing and controlling engine emissions, particularly NOx, is an important consideration in modern internal combustion engines, both spark-ignited and compression-ignited. Therefore, the systems, devices and methods described herein may be included in any exhaust system that has a reductant based SCR system.

FIG. 1 further shows engine 10 including an intake 23, an exhaust 25, a fuel system 18, an exhaust gas recirculation (EGR) system 26, and a control system 14. The engine 10 has a plurality of cylinders 30. Engine 10 may be controlled at least partially by control system 14 including controller 12, as well as by input from a vehicle operator 132 via an input device 130. In this example, input device 130 includes an accelerator pedal and a pedal position sensor 134 for generating a proportional pedal position signal.

The engine 10 includes an engine intake system 23 and an engine exhaust system 25. The engine intake 23 includes a throttle 62 fluidly coupled to the engine intake manifold 44 via an intake passage 42. In additional examples, e.g., diesel engines, throttle 62 may not included in engine 10. Intake passage 42 includes mass air flow (MAF) sensor 120 as well as ambient air temperature 121 and intake manifold 44 further includes manifold air pressure sensor 122. In additional examples, the engine 10 further includes an air induction system (AIS) (not shown), the AIS having an air filter and housing, various vapor purging valves such as from an engine crankcase or the fuel system 18, etc.

The engine exhaust system 25 includes an exhaust manifold 48 leading to an exhaust passage 35 that routes exhaust gas to the atmosphere. The engine exhaust system 25 includes sensors, for example, exhaust gas sensor 126 which may be an oxygen or lambda sensor, temperature sensor 128 and pressure sensor 129. The engine exhaust system 25 also may include one or more emission control devices 70, which may be mounted in a close-coupled position in the exhaust. One or more emission control devices may include a three-way catalyst, lean NOx trap, diesel particulate filter, diesel oxidation catalyst, hydrocarbon trap, etc. Further, in the present example, an SCR system 50 and EGR system 26 are included in the engine.

Engine 10 further includes turbocharger 180. Turbocharger 180 includes a compressor 182, schematically shown as linked to turbine 184 via turbo shaft 186. Additionally, turbocharger 180 may be a supercharger, lacking turbine 184 and may be mechanically linked to a crankshaft. Further still, compressor 182 may be driven, at least partially by an electric motor (not shown).

SCR system 50 includes a urea tank 52, coupled to urea pump system 54, which is further coupled to urea injector 56. The urea injector delivers urea into the exhaust system 25 upstream of a SCR catalyst 58 which receives the urea. The urea pump system 54 may include one or more pumps for pressurizing urea delivered to urea injector 56. Further example SCR systems may include more than one urea injector. After urea is delivered into the exhaust 25 it may convert to ammonia. Although the present example shows a urea-based system, in additional examples, any reductant may be used including ammonia and a urea and ammonia blend. SCR catalyst 58 may catalyze a reaction of ammonia with NOx to yield diatomic nitrogen and benign by-products such as water.

Ammonia sensor 200 is included downstream of SCR catalyst 58 to sense ammonia that travels downstream of SCR catalyst 58, and will be discussed in more detail below with regard to FIG. 2. Additionally, SCR system 50 may include a slip catalyst (not shown) located downstream of SCR catalyst 58. The slip catalyst may mitigate ammonia slip from SCR catalyst 58. The slip catalyst may catalyze one or both of a reaction to oxidize ammonia and a reaction to reduce NOx. Further a second ammonia sensor, of a similar type as ammonia sensor 200, may be included downstream of such an SCR slip catalyst, if desired.

EGR system 26 includes an EGR pipe 28 and an EGR valve 29. EGR pipe 28 directs, at least partially, exhaust gas flow from exhaust passage 35 back to intake passage 42. In the present example, EGR pipe 28 is shown coupled to exhaust passage 35 downstream of SCR system 50. However, in additional examples, EGR pipe 28 may be coupled to exhaust passage 35 upstream of SCR system 50, as well as upstream of emission control device 70 and also directly to exhaust manifold 48. In still further examples EGR pipe 28 may couple directly to intake manifold 44. EGR valve 29 may be an on/off valve or variable valve. EGR system 26 may also include a device coupled to EGR pipe 28, or placed intermediately along EGR pipe 28 for cooling air within EGR pipe 28, such as an intercooler (not shown).

Fuel system 18 may include a fuel tank 20 coupled to a fuel pump system 21. Fuel system 18 and/or throttle 62 may control a ratio of air-to-fuel inducted in to the engine 10. The fuel pump system 21 may include one or more pumps for pressurizing fuel delivered to the injectors of engine 10, such as the example injector 66 shown. While only a single injector 66 is shown, additional injectors may be provided for each cylinder or fuel may be injected into the manifold 44. It can be appreciated that fuel system 18 may be a return-less fuel system, a return fuel system, or various other types of fuel system. The fuel tank 20 may hold a plurality of fuels and fuel blends, including fuel with a range of alcohol concentrations.

Example engine 10 further includes control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126, temperature sensor 128, pressure sensor 129, pedal position sensor 134, MAF sensor 120, MAP sensor 122, ambient air temperature sensor 121, and ammonia sensor 200. Other sensors such as pressure, temperature, air-to-fuel ratio, and composition sensors may be coupled to various locations in the engine 10. As another example, the actuators may include fuel injector 66, reductant injector 56, EGR valve 29, and throttle 62. The control system 14 may include a controller 12, the controller 12 including computer readable storage medium, such as ROM or RAM memory, with instructions thereon. The controller may receive input data from the various sensors, process the input data, and trigger the actuators in response to the processed input data based on instruction or code programmed therein corresponding to one or more routines. Example control routines are described herein with regard to FIGS. 3-5.

Although not shown, engine 10 may also additionally include a turbocharger or supercharger system. A compressor may be coupled upstream of intake manifold 44 and downstream of throttle 62. Further embodiments include the compressor coupled upstream of throttle 62, the compressor coupled either upstream or downstream of EGR pipe 28 and a charge after cooler (CAC) may be disposed within, or adjacent to, the intake passage 42, for cooling compressed air. Further still, a turbine may be coupled downstream of exhaust 48 and upstream of emission control device 70.

Figure 2:
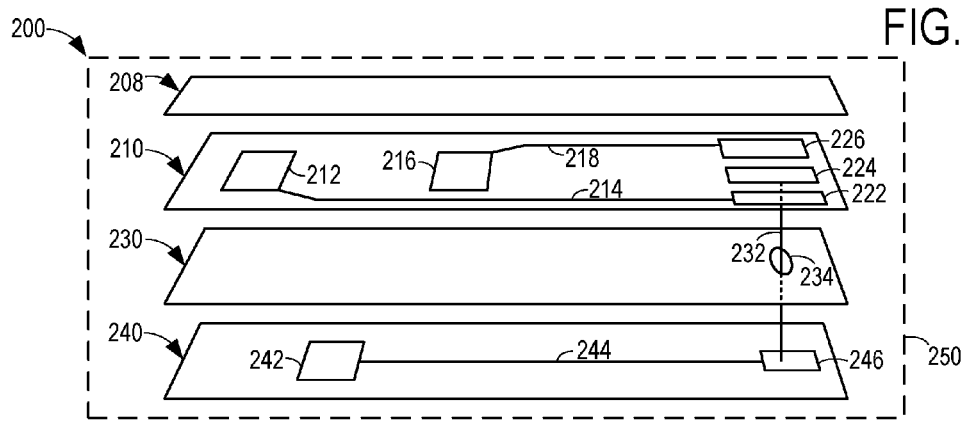
FIG. 2 shows an exploded view of an example ammonia sensor.

Turning now to FIG. 2 an exploded view of example ammonia sensor 200 is shown. Ammonia sensor 200 includes a first insulating layer 210, an electrolyte 230, and a second insulating layer 240 all disposed within a housing, shown abstractly at dashed box 250. Ammonia sensor may further include temperature sensing elements (not shown), and a heater (also not shown) to increase performance of the sensing elements, such as layers 210, 240, electrolyte 230 and further components included within ammonia sensor 200.

The first insulating layer 210, includes an $NH_3$ electrode 212, and $NO_2$ electrode 216. First insulating layer 210 may be protected by porous top layer 208. Electrode 212 is in physical and ionic communication with the electrolyte 230 and can be disposed in fluid communication with a sample gas (e.g., engine exhaust gas). Electrode 212 catalyzes $NH_3$ gas to produce electromotive force (EMF) and conducts electrical current produced by the EMF. In some examples, such an EMF may correspond to a magneto-resistance. Similarly, electrode 216 is in physical and ionic communication with the electrolyte 230 and can be disposed in fluid communication with a sample gas (e.g., engine exhaust gas). Also, electrode 216 catalyzes NOx gas to produce EMF and conducts electrical current produced by such an EMF.

Electrode 212 is electrically coupled to contact pad 222 by electrical lead 214. Likewise, electrode 216 is electrically coupled to contact pad 226 by electrical lead 218. A reference electrode 242 is disposed on the second insulating layer 240 and further, electrode 242 is in physical and ionic communication with the electrolyte 230. Reference electrode 242 is coupled to contact pad 224 via trans-layer lead 232, secondary contact 246 and electrical lead 244. Trans-layer lead 232 penetrates electrolyte 230 and remains electrically isolated from electrolyte 230 via insulation 234. Contact pads 222, 224 and 226 may be in electrical contact with an example controller, and provide electrical signals based on conditions at the electrodes 212, 242, 216 and electrolyte 230, such an electric potential between any two electrodes, and/or across electrolyte 230.

In the present example, exhaust is introduced to the electrode 212, the reference electrode 242 and electrode 216. The exhaust is diffused throughout the porous electrode materials. In the electrodes 212 and 216, electro-catalytic materials induce electrochemical-catalytic reactions in the sample gas. These reactions include electrochemical-catalyzing ammonia and oxide ions to form diatomic nitrogen and water, electrochemical-catalyzing $NO_2$ to form NO, diatomic nitrogen and oxide ions ($O^{-2}$), and electro-catalyzing NO and oxide ions to form $NO_2$. Similarly, in the highly catalytic reference electrode 242, electrochemical-catalytic material induces electrochemical reactions in the reference gas, primarily converting equilibrium oxygen gas (e.g., diatomic oxygen) to oxide ions or vice versa. The reactions at the electrodes 212, 242, 216 change the electrical potential at the interface between each of the electrodes 212, 242, 216 and the electrolyte 230, thereby producing an electromotive force (EMF). Therefore, the electrical potential difference between any two of the three electrodes 212, 242, 216 can be measured to determine an EMF.

In further examples, an EMF generated corresponds to a potential between two electrodes. In a first such example, the potential between the ammonia electrode 212 and the reference electrode 242 may correspond to an ammonia concentration plus a $NO_2$ sensitivity, in a second such example, the potential between the $NO_2$ electrode 216 and the reference electrode 242 may correspond to a $NO_2$ concentration, and in a third such example, the ammonia electrode 212 and the $NO_2$ electrode 216 EMF can be compared to determine an ammonia and $NO_2$ concentration. In this way, measurable potentials (e.g., such as those measured at contact pads 222, 224, and 226) may provide electrical signals that may be used to calculate and/or derive concentrations of ammonia and NOx in the exhaust.

Because the primary reactants at electrode 212 are ammonia, water and diatomic oxygen, the EMF generated at the electrode is due in part to the partial pressures of each of these gases. Oxygen is measurable, for example, using a lambda or exhaust gas sensor, such as at 126. Therefore, the remaining EMF signal can be attributed to ammonia and water. Consequently, an ammonia concentration measurement may include the partial pressure of water vapor in the exhaust. In this way, an ammonia sensor can be used to infer humidity, such as ambient humidity of an ambient environment of a vehicle including the sensor in the engine exhaust. Similarly, $NO_2$ concentration may be measured using an EMF signal generated by reaction products at the $NO_2$ electrode 216.

Figure 3:
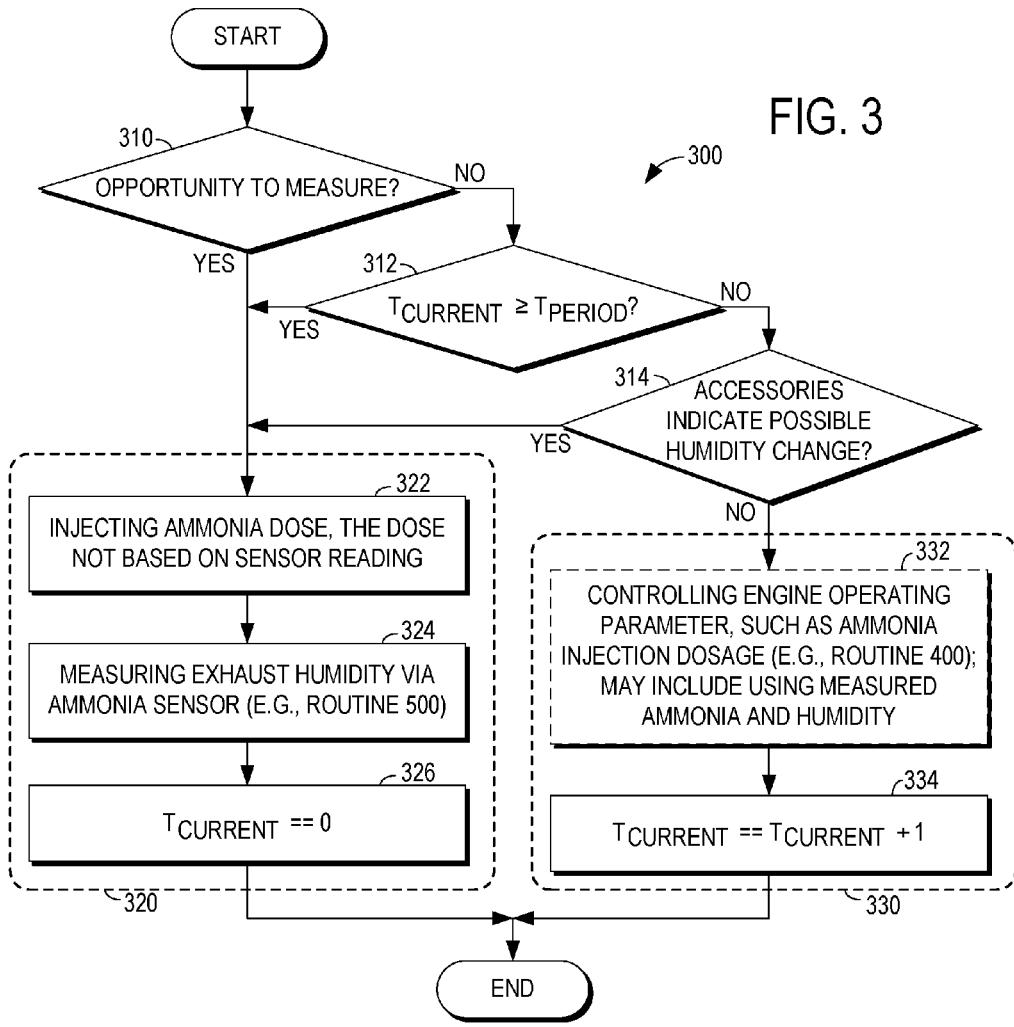
FIG. 3 shows an example high level routine for controlling ammonia and humidity concentration measurements using an ammonia sensor.

FIG. 3 shows an example high level routine 300 for controlling ammonia and humidity concentration measurements using an ammonia sensor. The routine may be executed in a vehicle control system, for example, and may be repeated any number of times for real-time execution. During the routine 300, a variable associated with time, $T_{CURRENT}$, may be used to track a number of iterations of the routine, and thus to track time. Additionally, the routine may include further or alternate methods of tracking time, such as time stamps, or reference to a clock.

In some examples, the routine 300 includes determining if there indication of potential humidity change. Such an indication may be detected, for example, at 312, 314 and 316 of routine 300, described below. In the present example, routine 300 starts at 310 by determining if there is an opportunity to measure humidity. Such an opportunity may be indicated by a user-initiated change in an air-to-fuel ratio, or an anticipated change in air-to-fuel ratio. A user-initiated (e.g., operator commanded) change in air-to-fuel ratio may be a tip-in or a tip-out event such as input device 130, described above in FIG. 1. If an opportunity to measure humidity is detected the routine may continue to 322.

Next, if it is determined that there is no opportunity to measure humidity at 310, the routine 300 may continue to 312 to test if $T_{CURRENT}$ is greater than or equal to $T_{PERIOD}$. $T_{PERIOD}$ may be a predetermined amount of time between humidity measurements chosen to ensure that the fastest envisioned change in humidity that may occur is detected, like driving a vehicle that includes the example control system, from a dry environment into a rain storm. If $T_{CURRENT}$ is greater than or equal to $T_{PERIOD}$, then the routine continues to 322.

At 314, routine 300 includes assessing if there is an indication of possible humidity change from an accessory. An indication of a change in humidity from accessories of the engine may include engaging or disengaging windshield wipers (e.g., a windshield wiper condition), or turning on or off a component in a heating ventilation and air conditioning (HVAC) system (e.g., changing a vehicle climate control parameter). The routine may check on a status of any such relevant accessory, and may continue to 322 if a potential humidity change is indicated. If no accessory indicates a possible humidity change, then the routine may continue to 332.

If there is an opportunity to measure humidity at 310, or if $T_{CURRENT}$ is greater than $T_{PERIOD}$ at 312 or if the accessories indicate a potential humidity change at 314, then in response, the routine may continue to 322 which includes injecting an ammonia dose, the dose not based on the ammonia sensor's reading. Because the ammonia sensor will be used to measure humidity, and readings from the ammonia sensor may detrimentally impact an ammonia sensor feedback control (as described below, at the least in FIG. 4). However, because the engine may continue to produce NOx, ammonia and/or urea injection is continued. The dose injected at 322 may be a preset amount or rate injected into the SCR system. Additionally, the dose injected at 322 may be a dose injected in a previous iteration of routine 300 (e.g., though ammonia injection dosage is independent of current ammonia sensor feedback it may be based on previous ammonia sensor feedback). Further, the dose injected at 322 may be a feed-forward amount anticipated by engine conditions such as engine load, speed, mass air flow and the like. Further still, the dose injected at 322 may be a feed-forward amount anticipated for a maximum air-to-fuel ratio used later in routine 300, for example at 324.

After 322, the routine may continue to 324, measuring exhaust humidity via the ammonia sensor. One example of such a process is described in more detail below as routine 500 in FIG. 5. After humidity has been measured using the ammonia sensor, the $T_{CURRENT}$ variable to zero. In the present example the double equal sign "==" is taken to mean assignment, as opposed to a logical test. After $T_{CURRENT}$ has been reset, the routine may end.

At 322, 324, and 326, the routine may be operating in a first mode, as shown by dashed box 320. In a first example, first mode 320 may include at least one of recalibrating and measuring an exhaust humidity via an ammonia sensor during two different air-to-fuel ratios. Further, in a second example first mode 320 may include adjusting ammonia injection independent of the sensor while indicating ambient humidity based on the sensor. What is more, in the second example ambient humidity may be based on a first ammonia sensor reading at a first lean air-fuel-ratio and a second ammonia sensor reading at a second lean air-fuel-ratio, the ambient humidity further based on the first and second lean air-fuel-ratios. Engine airflow may be adjusted between a first engine airflow and a second engine airflow to generate the first and second lean air-fuel-ratios, respectively, the engine airflow adjusted while maintaining fuel injection to maintain engine torque.

If there is no opportunity to measure humidity at 310, or if $T_{CURRENT}$ is less than $T_{PERIOD}$ at 312 or if the accessories do not indicate a potential humidity change 314, then the routine may continue to 332 to control ammonia injection dosage. The box at 332 is shown with a dashed line box to indicate its optional nature, and may be excluded from some examples of routine 300. One example of 332 is described below in FIG. 4 at routine 400. After controlling ammonia injection dosage, the routine includes incrementing variable $T_{CURRENT}$ by one. Finally, the routine may end after 334.

At 332, and 334 the routine may be operating in a second mode, as shown by dashed box 330. The second mode 330 includes controlling ammonia injection dosage via feedback from the ammonia sensor, such as at 332 and further described in routine 400, described below in FIG. 4. Further, the second mode may include adjusting ammonia injection in response to the ammonia sensor, and may additionally include correcting an amount of ammonia measured for ambient humidity. Further, second mode 330 may include increasing or decreasing additional engine parameters, such as mass air flow, fuel injected or HVAC dehumidification in response to ambient humidity (as detected, for example, in first mode 320 at 324). More generally, the inferred humidity may be used to modify any engine parameter to optimize the engine for reducing emissions and improving fuel economy.

In the present example of routine 300, box 320 indicates a first mode and box 330 indicates a second mode. However, in additional examples, box 320 may be a second mode and box 330 may be a first mode. Also, each operating mode may be include further operating modes. In one such example, second mode 330, includes a further first mode including adjusting engine operation in response to an ammonia amount identified by the ammonia sensor and a further second mode including adjusting engine operation in response to an ambient humidity identified by the ammonia sensor.

Figure 4:
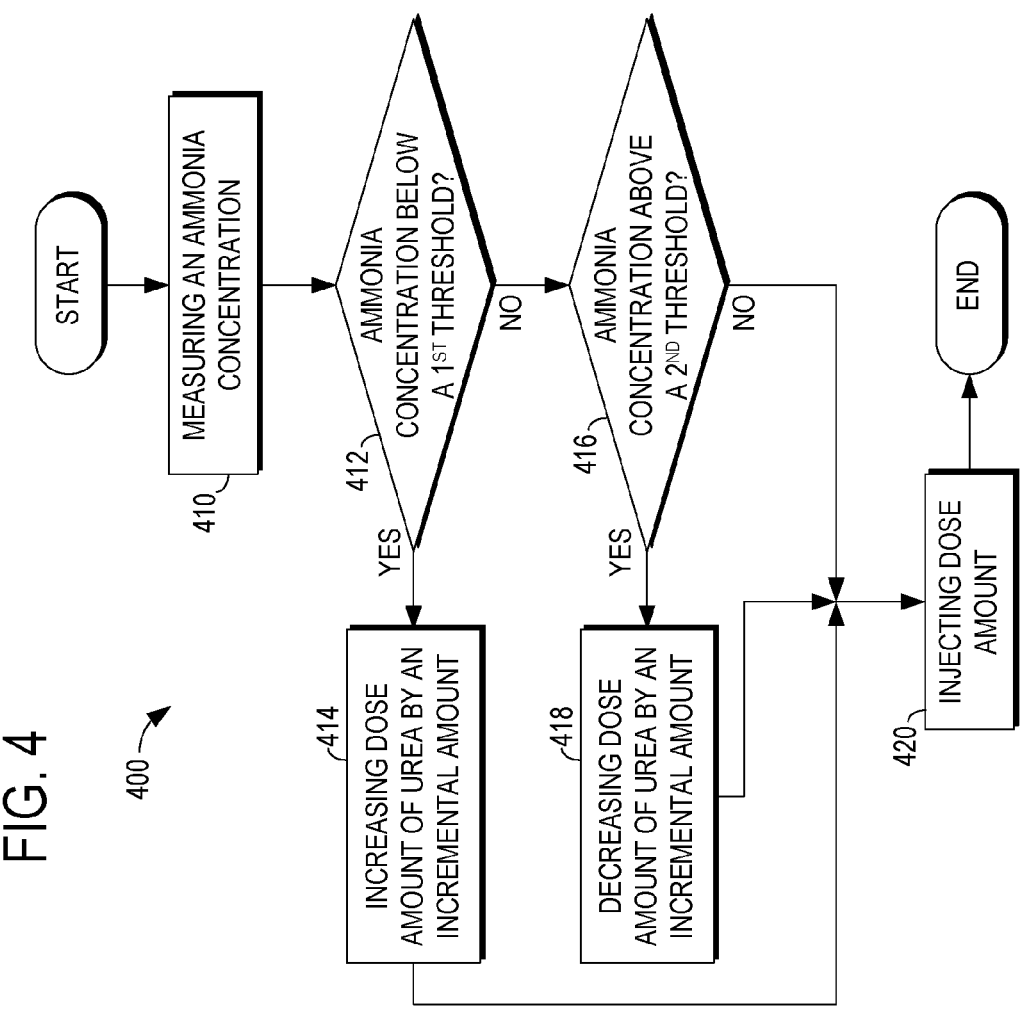
FIG. 4 shows an example routine for controlling ammonia dosing to an SCR catalyst.

FIG. 4 shows an example routine 400 for controlling ammonia dosing to an SCR catalyst. Routine 400 is one example of a subroutine of high level routine 300 included at 332. However, in further examples, routine 400 may run independent of routine 300. Further routine 400 is one example of instructions to during a mode, inject reductant based on a reading of the ammonia sensor.

Routine 400 includes, at 410 measuring an ammonia concentration. As described above, an example ammonia sensor may generate an EMF (which may be a concentration signal) that further may be correlated with a partial pressure of an engine's exhaust gas. If humidity and oxygen concentration are known, for example by a lambda sensor or through routine 500 described below, the ammonia concentration in the gas may be deduced. In a further example, routine 400 includes adjusting the ammonia reading from the sensor using humidity concentration and the air to fuel ratio in conjunction with a lookup table based on FIG. 6 (described below) at 410 to deduce ammonia concentration.

At 412, routine 400 includes determining if ammonia concentration is below a first threshold. The first threshold may be a NOx emissions threshold, such that if ammonia concentration is below the first threshold, undesired NOx emissions may be released from the engine into the atmosphere. If ammonia concentration is below the first threshold the routine may continue to 414 which includes increasing a dose amount of urea to be injected to the SCR catalyst by an incremental amount. In alternate examples of the routine 400, the increase may be proportional to some other measured engine condition, such as engine load, rather than being an incremental increase. After 414 the routine then continues to 420 to inject the increased dose amount and then the routine may end.

If ammonia concentration is not below a first threshold at 412, the routine may continue to 416, which includes determining if ammonia concentration is above a second threshold. The second threshold may be an ammonia slip threshold such that if ammonia concentration is above the second threshold, undesired ammonia may be released from the engine into the atmosphere, and/or indicate excessive usage of reductant. If ammonia concentration is above the second threshold the routine may continue to 418 which includes decreasing a dose amount of urea to be injected to the SCR catalyst by an incremental amount. Similarly to 414 discussed above, in additional examples of routine 400, decreasing the urea dose may be done proportional to other monitored engine parameters and conditions like engine load and exhaust temperature, instead of being incremental. After 418 the routine then continues to 420 to inject the decreased dose amount and then the routine may end.

Finally, if ammonia concentration is not above a second threshold and is not below a first threshold, the routine may continue to 420, injecting a dose amount of urea. The dose amount may be the dose amount unchanged from a previous iteration of the routine 400 or may be a predefined value. Further, the dose amount may be an anticipated amount based on engine measurements and conditions such as engine load, engine speed, fuel injection amount, air-to-fuel ratio, exhaust temperature, exhaust pressure and the like. In further examples of routine 400, urea may be replaced by ammonia or other NOx reductants. Further, rates of injection may be used instead of amounts.

Figure 5:
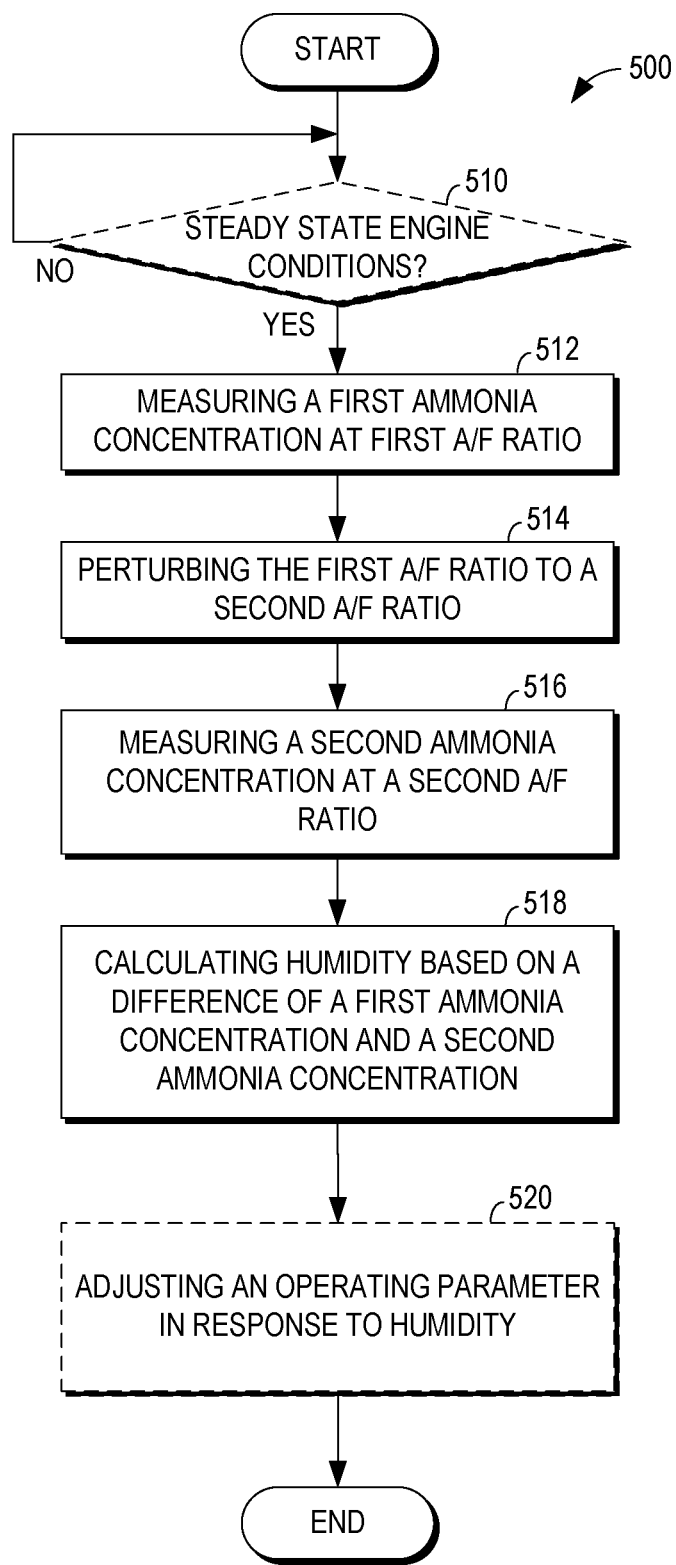
FIG. 5 shows an example routine for measuring humidity via an ammonia sensor.

Turning now to FIG. 5 an example routine 500 for measuring humidity via an ammonia sensor is shown. Routine 500 is one example of a subroutine included in high level routine 300 at 324. However, in further examples, routine 500 may run independent of routine 300.

Routine 500 is one example of a method for measuring humidity via an ammonia sensor in an exhaust of an engine includes measuring a first ammonia concentration at a first air-to-fuel ratio, perturbing the first air-to-fuel ratio to a second air-to-fuel ratio, measuring a second ammonia concentration at a second air-to-fuel ratio, and calculating or determining humidity based on a difference of the first ammonia concentration and the second ammonia concentration.

First, at 510, routine 500 includes determining if engine conditions are in a steady-state. Steady-state conditions may include constant exhaust flow, temperature, pressure, concentrations of ammonia, concentration of NOx and other gas species. If the engine is not in a steady-state, the routine may repeat the test until the engine is in a steady-state. Further examples of routine 500 may include processes, devices or systems for bringing about steady-state engine conditions, before returning to 510. However, steady-state engine conditions are not a requirement for carrying out further actions in routine 500, as long as oxygen concentration is known. The boundary at 510 is dashed to indicate the optional nature of the determination, and additional examples of routine 500 do not include 510.

Next, the routine continues to 512, which includes measuring a first ammonia concentration at a first air-to-fuel (A/F) ratio. As described above, an example ammonia sensor may generate an EMF (which may be a concentration signal) by catalysis at an example electrode; such EMFs are then used to derive $NH_3$ concentration. Once a measurement has occurred, routine 500 may continue to perturb the first A/F ratio to a second A/F ratio at 514. Perturbing the first A/F ratio may include generating an square-wave pulse width (PW) in the fuel injectors in the engine, and/or changing engine airflow. The square-wave PW may be a square-wave pattern, and as a result of the square-wave PW, exhaust air-fuel-ratio may oscillate between a first exhaust air-fuel-ratio and a second exhaust air-fuel-ratio. Perturbing the first A/F ratio may occur in response to a user input or operator command, such as a tip-in or a tip-out event, as described above with respect to 310, FIG. 3. Further, the perturbation may bring about a faster change of percent $O_2$ than percent change of $NH_3$.

Next, the routine includes measuring a second ammonia concentration at a second A/F ratio at 516. Finally the routine includes calculating humidity based on a difference of a first ammonia concentration and a second ammonia concentration at 518. The calculation may be done using signals generated by the given concentrations of gasses. In one example a first ammonia concentration is measured when oxygen is 5 percent of the mass of the air (roughly 20:1 air-to-fuel ratio) and a second ammonia concentration is measured when oxygen is 14 percent of the mass of the air (roughly 50:1 air-to-fuel ratio). As is shown in FIG. 6 described below, an error results from ammonia concentration measurements made at a given humidity.

In other words, the $NH_3$ concentration should stay relatively constant and because oxygen concentration is known during each of the ammonia concentration measurements (from either engine calculated percent $O_2$ or oxygen sensor measurements), then if there is a discrepancy between the first and second ammonia concentration measurements, the resulting error comes from humidity.

Figure 6:
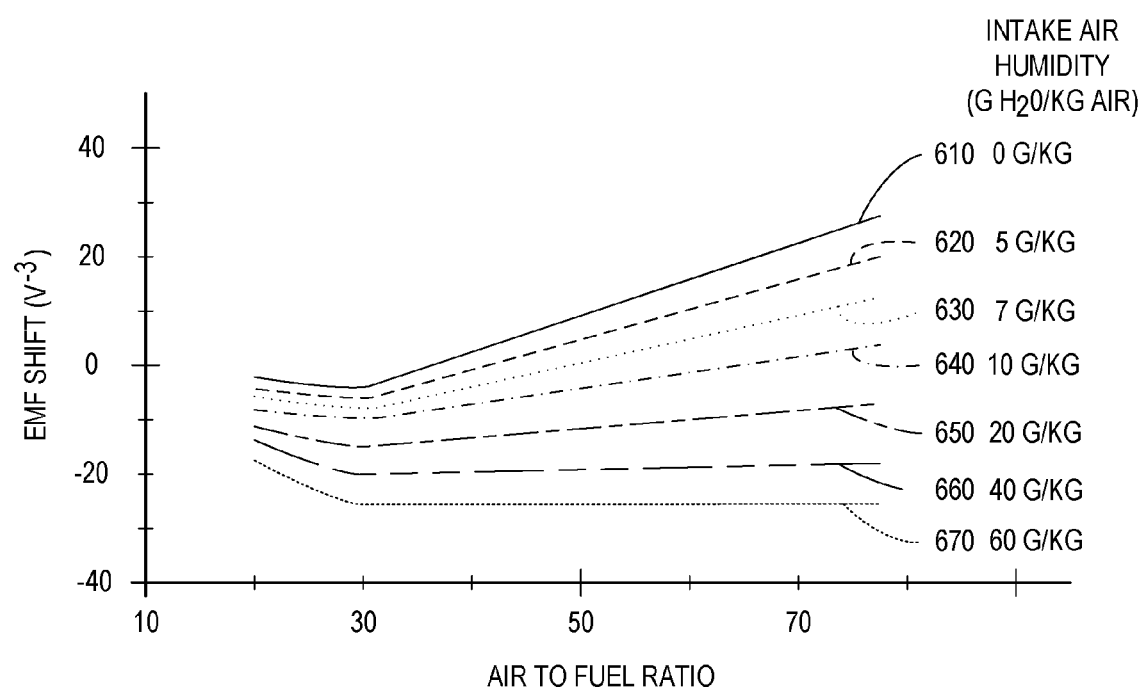
FIG. 6 is a graph illustrating the relationship between error in NH3 ammonia reading measured by an ammonia sensor and air-to-fuel ratio for various amounts of humidity.

FIG. 6, discussed in more detail below, shows examples of such resulting ammonia concentration measurements. If the humidity is dry (0 percent mass of water vapor in the exhaust at 610), the signal goes up as a percentage of diatomic oxygen goes up and the EMF signal goes down as the percentage of diatomic oxygen goes down. If the humidity is wet (6% or 60 g of water per kg of air as shown at 670), the signal goes down as the percentage of diatomic oxygen goes up and the signal goes up as the percentage of diatomic oxygen goes down.

Returning to FIG. 5, in one example, a generalized error in the ammonia concentration signal is calculated (e.g., at 518) using an example delta:

$$\frac{\left(2^{nd} \text{ ammonia concentration signal} - 1^{st} \text{ ammonia concentration signal}\right)}{\sqrt{\left(((2^{nd} \text{ ammonia concentration signal})^2)/2 + ((1^{st} \text{ ammonia concentration signal})^2)/2\right)}}$$

Because of the dynamics of an example engine, under steady-state conditions, a change of $NH_3$ concentration may be slow in comparison to a change of in percent $O_2$ (i.e. A/F ratio). Consequently, any change of the EMF from the $NH_3$ sensor may be substainally due to the percent $O_2$ change and the intake humidity (g/kg $H_2O$). Further, the example delta above is independent of ammonia concentration and relies only on an EMF signal generated by the ammonia sensor, and is independent of actual ammonia concentration in the exhaust. Example delta is one way of tracking the partial pressure due to humidity in exhaust gas. Further the calculated humidity may be an ambient humidity (as discussed above).

Once the routine has completed calculating the humidity based on the difference of first and second ammonia concentrations at 518, the routine may end. However, additional processes in routine 500 or additional subroutines run in an engine control system may use the calculated or inferred humidity value. Optionally, (as indicated by the dashed box) routine 500 may continue to 520 to adjusting an operating parameter in response to the calculated ambient humidity. For example, a mass air flow amount may be increased or decreased in response to the ambient humidity Likewise, an amount of fuel injected into an example engine cylinder (e.g., a combustion chamber 30 described above with respect to FIG. 1) may be increased or decreased in response to ambient humidity. In a further example, an HVAC system may increase or decrease dehumidification in response to the detected humidity. In a still further example, an EGR valve may increase or decrease the amount of EGR returned to the engine in response to the detected humidity. In yet a further example, readings of exhaust oxygen and/or NOx concentration may be adjusted based on the detected humidity. Adjusting a given engine operating parameter may be included as part of operating in an engine mode (e.g., second engine mode 330 described above with respect to FIG. 3). Additionally, ammonia concentration may be adjusted using information about detected humidity, such as at 410 in routine 400, described above with respect to FIG. 4.

In this way, ambient humidity may be measured via an ammonia sensor and the detected value may be used to control and refine engine control parameters, vehicle cabin climate, EGR systems and SCR systems. Further the inferred measurement of humidity has the advantage of a lower cost than adding an extra sensor, and it is more reliable, since there are fewer parts.

Further, routine 500 is one example of instructions to during a mode, generate a first exhaust air-fuel-ratio, receive a second reading of an ammonia sensor at the first exhaust air-fuel-ratio (e.g., at 512), generate a second exhaust air-fuel-ratio (e.g., at 514), receive a third reading of the ammonia sensor at the second exhaust air-fuel-ratio (e.g., at 516), determine ambient humidity based on a difference between the second and third readings of the ammonia sensor (e.g., at 518), and inject the reductant based on the first reading of the ammonia sensor (e.g., at 322, as describe above in FIG. 3).

FIG. 6 is a graph illustrating example relationships between error in humidity measured by one example ammonia sensor and air-to-fuel ratios for various amounts of humidity. Each curve represents a constant humidity, measured in grams of water vapor to kilograms of air. Curve 610 is a dry curve (0 g/kg), curve 620 is at 3 g/kg, curve 630 is at 7 g/kg, curve 640 is at 10 g/kg, curve 650 is at 20 g/kg, curve 660 is 40 g/kg, and curve 670 is at 60 g/kg. Based on such trends, an example map, look-up table or similar calculation may be used to determine humidity from signals associated with ammonia sensor concentrations, for example as done in 518 in FIG. 5.

Continuing with FIG. 6, in one example of curve 610, dry air enters an example intake (e.g., intake passage 42), and the air to fuel ratio (A/F) is increased form 30:1 to 70:1 in a step-wise fashion, an EMF signal rises from −5 mV up to +25 mV. Such a change indicates that the ambient air is dry. By comparison, a higher ambient humidity (for example curve 670 with 60 g $H_2O$/kg air), a measurement remains constant at −25 mV before and after a perturbation to the A/F ratio such as an example percent $O_2$ square wave oscillation (e.g., 30:1 to 70:1 change of A/F ratio). In this way, a constant EMF measurement from an example $NH_3$ sensor may indicate humidity.

Further, an intake temperature reading (for example, as monitored by _121), combined with psychometric saturation values (which, in some examples, are stored, as a table in a memory of controller 12) may be used to check and/or correct the values of example maps, look-up tables or similar calculations used to determine humidity from signals associated with ammonia sensor concentrations (as described above). In one example an intake air temperature is very cold, such as −50 degrees Fahrenheit, the psychometric saturation value of humidity is 0.02 g/kg. Hence, a change in EMF should be close to that predicted by line 610. In an additional example, an intake air temperature reading of 90 degrees Fahrenheit may have a psychometric saturation value at 31 g/kg, or between lines 650 and 660 of FIG. 6. So, the expected change of EMF from the $NH_3$ sensor should be small for a given A/F perturbation, such as with a percent $O_2$ square wave. Additionally intake air temperature may be combined with an indication that a vehicle accessory is active (such as windshield wipers) to may indicate humid ambient conditions. Consequently, checking during various temperature conditions may confirm or disconfirm the accuracy of curves used to calculate humidity measurements, such as 610, 620, 630, etc. of FIG. 6.

Further, still calibration curves, such as those shown in FIG. 6 (e.g., at 610, 620, etc.) may be dependent on the $NH_3$ sensor design and how it is produced. Therefore, the A/F and humidity curve may be specified and not changed over time. Alternatively, if it is determined that the design or production of the NH3 sensor results in variable of the curves, on a part-to-part basis, then a part identification of an example sensor or a connector of the sensor may determine a set of A/F and humidity calibration curves. For example, a trimmed resistor in the connector or a simple memory chip in the connector could be detected by an example control system (e.g, control system 14). In one example, the controller would reference a look up table for that particular $NH_3$ sensor is connected and have the correct A/F and humidity chart to find ambient humidity.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine having an exhaust with an ammonia sensor, comprising:

adjusting an operating parameter in response to ambient humidity, the ambient humidity based on a first ammonia sensor reading at a first exhaust air-fuel-ratio and a second ammonia sensor reading at a second exhaust air-fuel-ratio.

2. The method of claim 1 wherein the operating parameter is an engine parameter, and where the first ammonia sensor reading is a first ammonia concentration, and the second ammonia sensor reading is a second ammonia concentration, where an exhaust air-fuel-ratio oscillates between the first exhaust air-fuel-ratio and the second exhaust air-fuel-ratio.

3. The method of claim 2 wherein the ambient humidity is based on a difference between the first ammonia concentration and the second ammonia concentration, and further based on a partial pressure of water vapor in the exhaust.

4. The method of claim 1 wherein an engine exhaust flow rate is substantially at steady-state when identifying the first ammonia sensor reading and the second ammonia sensor reading, the first air-fuel-ratio different from the second air-fuel-ratio, the first air-fuel-ratio being lean and the second air-fuel-ratio being lean.

5. The method of claim 1 further comprising perturbing the exhaust air-fuel-ratio between the first exhaust air-fuel-ratio and the second exhaust air-fuel-ratio during steady exhaust flow conditions by adjusting fuel injection in a square-wave pattern, and while an operator command is steady.

6. The method of claim 1 further comprising perturbing the exhaust air-fuel-ratio between the first exhaust air-fuel-ratio and the second exhaust air-fuel-ratio in response to an operator commanded tip-in or tip-out.

7. The method of claim 1, where the ammonia sensor comprises:

a first insulating layer comprising an ammonia electrode and a NOx electrode, the ammonia electrode coupled to a first contact pad and the NOx electrode coupled to a second contact pad;

a second insulating layer comprising a reference electrode coupled to a further contact pad; and an electrolyte, each electrode in physical and ionic communication with the electrolyte, and the first layer, second layer and electrolyte all disposed within a housing.

8. The method of claim 1, where the ammonia sensor is located downstream of a selective catalyst reduction catalyst, the catalyst receiving urea via urea injection.

9. A method using an ammonia sensor in an engine exhaust SCR system, comprising:

in a first mode, identifying ambient humidity by measuring an ammonia concentration via the ammonia sensor during two different air-fuel-ratios, the measuring in response to an indication of a potential humidity change.

10. The method of claim 9 further comprising:

in a second mode, controlling an ammonia injection dosage via feedback from the ammonia sensor, where during the first mode, ammonia injection dosage is independent of current ammonia sensor feedback and based on previous ammonia sensor feedback.

11. The method of claim 9, where the indication of potential humidity change is based on a vehicle climate control parameter.

12. The method of claim 9, where the indication of potential humidity change is based on a windshield wiper condition.

13. A method for an engine having an ammonia sensor in an exhaust downstream of an SCR catalyst, comprising:
- during a first mode, adjusting ammonia injection in response to the sensor; and
- during a second mode, adjusting ammonia injection independent of the sensor while indicating ambient humidity based on the sensor.

14. The method of claim 13 wherein the engine is a diesel engine and, during the second mode, ambient humidity is based on a first ammonia sensor reading at a first lean air-fuel-ratio and a second ammonia sensor reading at a second lean air-fuel-ratio, the ambient humidity further based on the first and second lean air-fuel-ratios.

15. The method of claim 14 wherein engine airflow is adjusted between a first engine airflow and a second engine airflow to generate the first and second lean air-fuel-ratios, respectively, the engine airflow adjusted while maintaining fuel injection to maintain engine torque.

16. A method using an ammonia sensor in an engine exhaust SCR system, comprising:
- during a first mode, adjusting engine operation in response to an ammonia amount identified by the ammonia sensor; and
- during a second mode, adjusting engine operation in response to an ambient humidity identified by the ammonia sensor.

\* \* \* \* \*